March 3, 1964 J. M. COOMBS 3,122,943

DATA STORAGE APPARATUS CONTROLS

Original Filed May 2, 1949 10 Sheets-Sheet 1

March 3, 1964 J. M. COOMBS 3,122,943

DATA STORAGE APPARATUS CONTROLS

Original Filed May 2, 1949 10 Sheets-Sheet 2

March 3, 1964 J. M. COOMBS 3,122,943

DATA STORAGE APPARATUS CONTROLS

Original Filed May 2, 1949 10 Sheets-Sheet 3

March 3, 1964 J. M. COOMBS 3,122,943

DATA STORAGE APPARATUS CONTROLS

Original Filed May 2, 1949 10 Sheets-Sheet 4

March 3, 1964 J. M. COOMBS 3,122,943

DATA STORAGE APPARATUS CONTROLS

Original Filed May 2, 1949 10 Sheets-Sheet 5

March 3, 1964 J. M. COOMBS 3,122,943

DATA STORAGE APPARATUS CONTROLS

Original Filed May 2, 1949 10 Sheets-Sheet 6

March 3, 1964 J. M. COOMBS 3,122,943

DATA STORAGE APPARATUS CONTROLS

Original Filed May 2, 1949 10 Sheets-Sheet 8

March 3, 1964 J. M. COOMBS 3,122,943

DATA STORAGE APPARATUS CONTROLS

Original Filed May 2, 1949 10 Sheets-Sheet 10

United States Patent Office 3,122,943
Patented Mar. 3, 1964

3,122,943
DATA STORAGE APPARATUS CONTROLS

John M. Coombs, Poughkeepsie, N.Y., assignor, by mesne assignments, to Sperry Rand Corporation, New York, N.Y., a corporation of Delaware
Application Nov. 12, 1954, Ser. No. 468,455, which is a division of application Ser. No. 90,941, May 2, 1949. Divided and this application Aug. 16, 1960, Ser. No. 59,470
6 Claims. (Cl. 74—661)

The present invention relates to data storage apparatus controls and, more particularly, to means for controlling the drive of such an apparatus.

This application is a division of my copending application Serial No. 468,455, filed November 12, 1954, which is a division of a now abandoned application, Serial No. 90,941, filed May 2, 1949.

In various lines of endeavor, for example, computing and recording, it is desirable to store information for a period of time and yet have the information readily available for reading or alteration. Apparatus and systems for this purpose are disclosed in the Arnold A. Cohen, William R. Keye and Charles B. Tompkins Patent 2,540,-654 issued February 6, 1951, for Data Storage Systems, and in the John M. Coombs and Charles B. Tompkins Patent 2,617,705 issued November 11, 1952, for Data Storage Apparatus.

During either reading or erasing of signals the drum of said applications may be continuously rotated at a speed of the order of 220 r.p.m. As is also mentioned in said applications, signals may be altered or recorded during rotation of the drum at the high speed mentioned. However, in the original recording of data upon the drum, it is frequently desirable to move the drum non-continuously, viz., step by step, and in such a way that a cell or discrete data receiving area thereon will be stationary with respect to a recording magnet for the brief interval of time required for recording. In addition, it will be desirable to have all data start, or be located at a predetermined position with respect to a given point circumferentially of the drum and the magnets or other data transmitting members. Therefore, it is desirable to include controls to bring that starting or homing point of the drum into proper position with respect to the magnets. It is desirable to rotate the drum at somewhat lower speed to bring or "home" the drum to such starting point.

An object of the present invention is to provide a driving and control means for a movable data storage element, or other movable element, including arrangements to continuously move the element at high speed or low speed, or to move it intermittently or step by step.

A further object of the invention is to provide control means whereby the driving means for a data storage element or other movable element will be operative to provide either continuous or step by step movement.

Still another object of the invention is to provide control means whereby a data storage element can be moved to a predetermined position and then slowly moved, for example, step by step, to finally bring it to the exact position desired.

Other objects and advantages of the invention will be apparent from the following specification and accompanying drawings, in which drawings FIGURE 1 is a front elevation of the apparatus of the invention.

FIGURE 5 is also an enlarged view of mechanism partially shown at the bottom of FIGURE 2.

Figure 11:
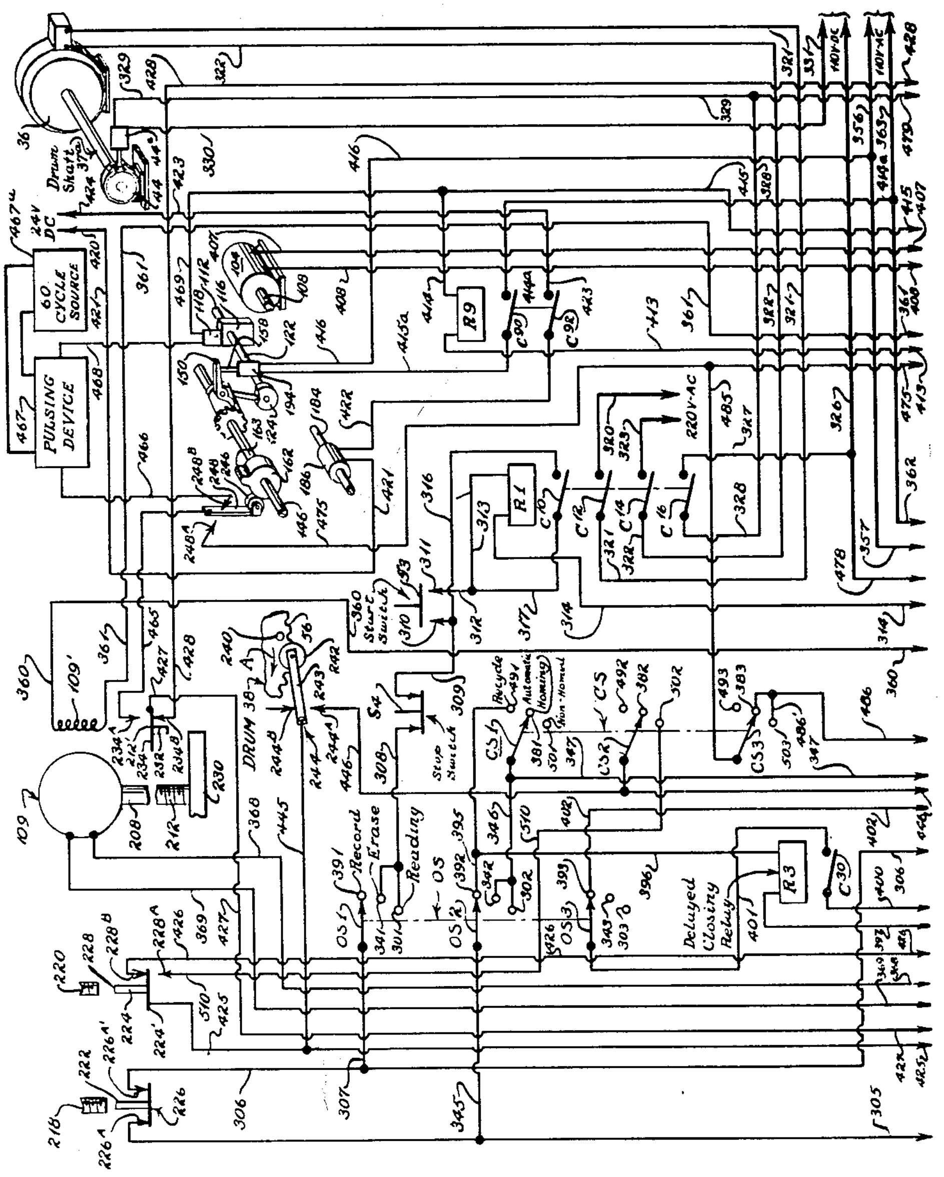
Figure 12:
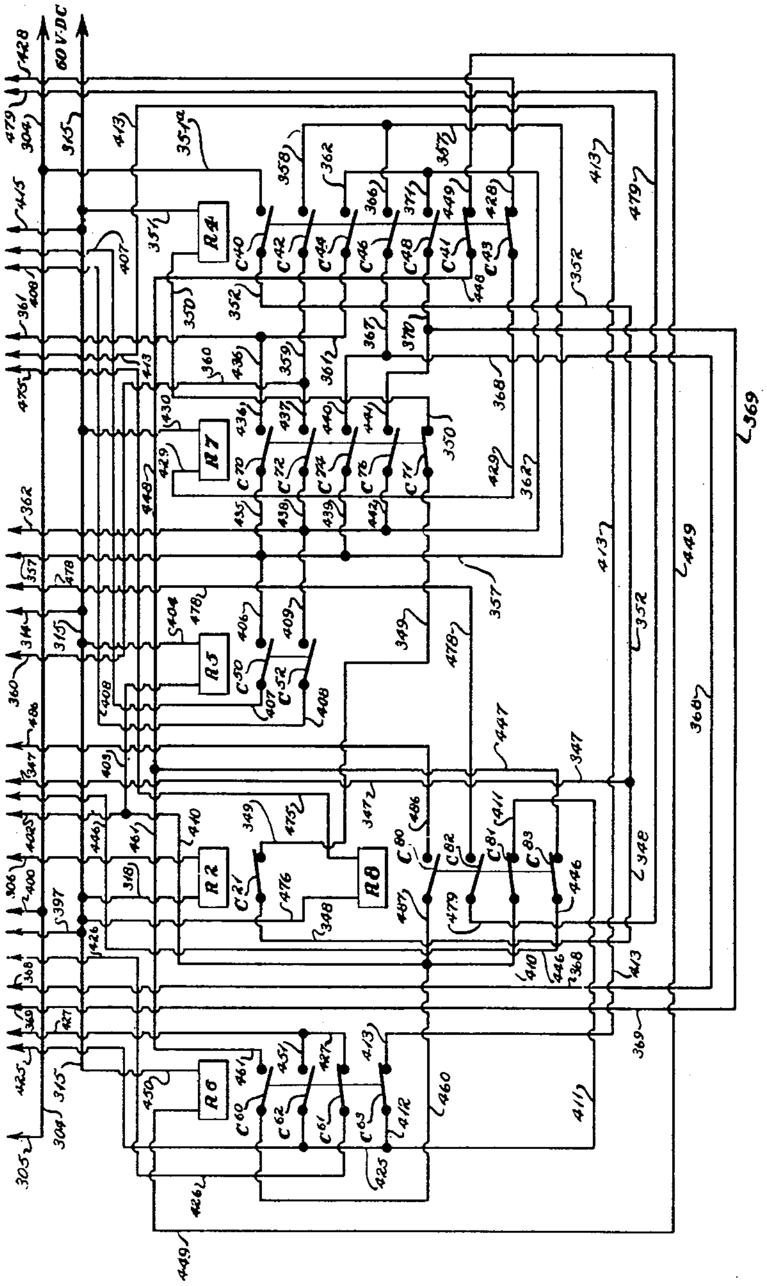

FIGURES 11 and 12, together, diagrammatically illustrate drive controlling circuits for the data storage element.

Figure 13:
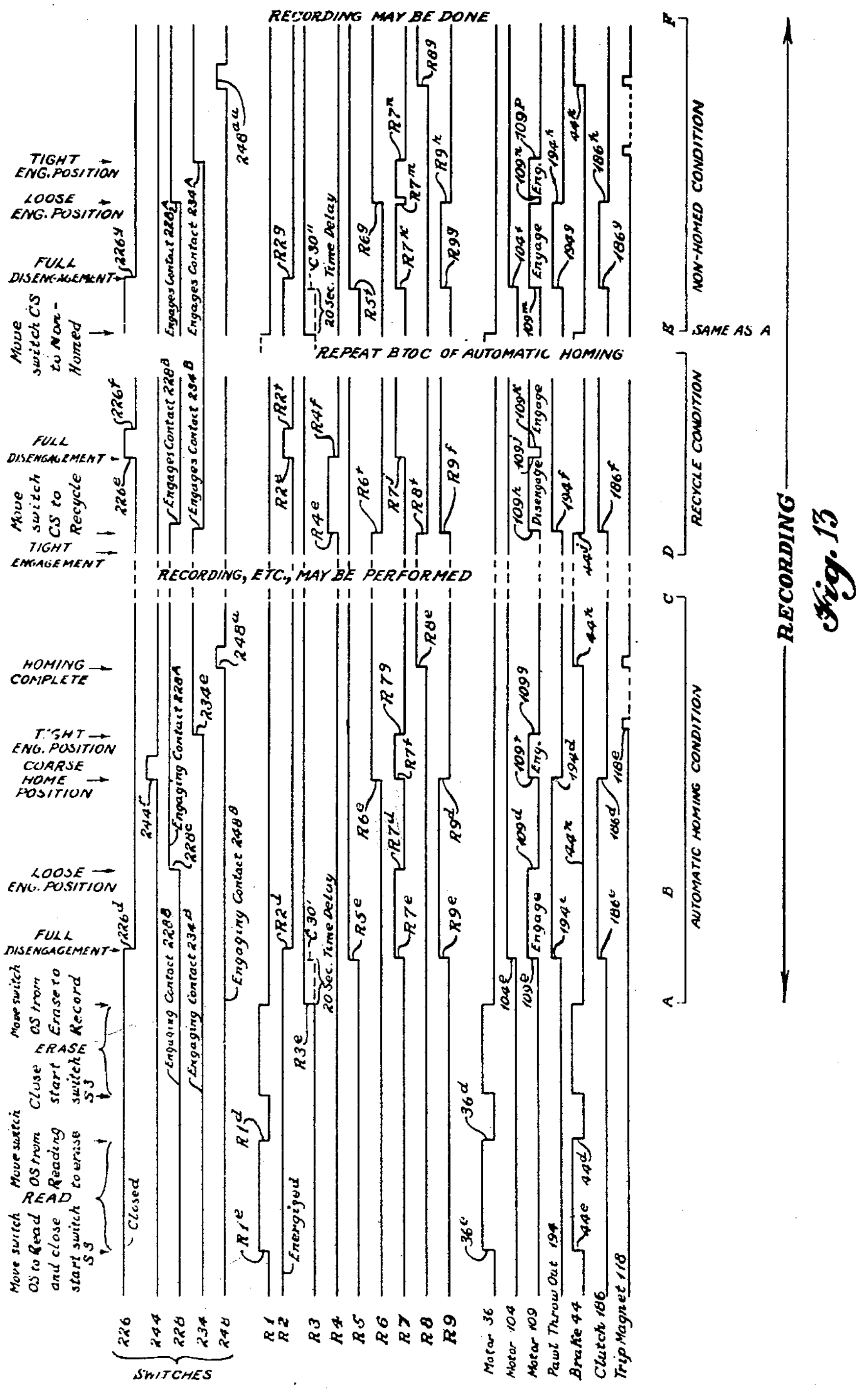

FIGURE 13 is a chart indicating the sequence of operation of the various elements of the circuits of FIGURES 11 and 12.

Figure 1:
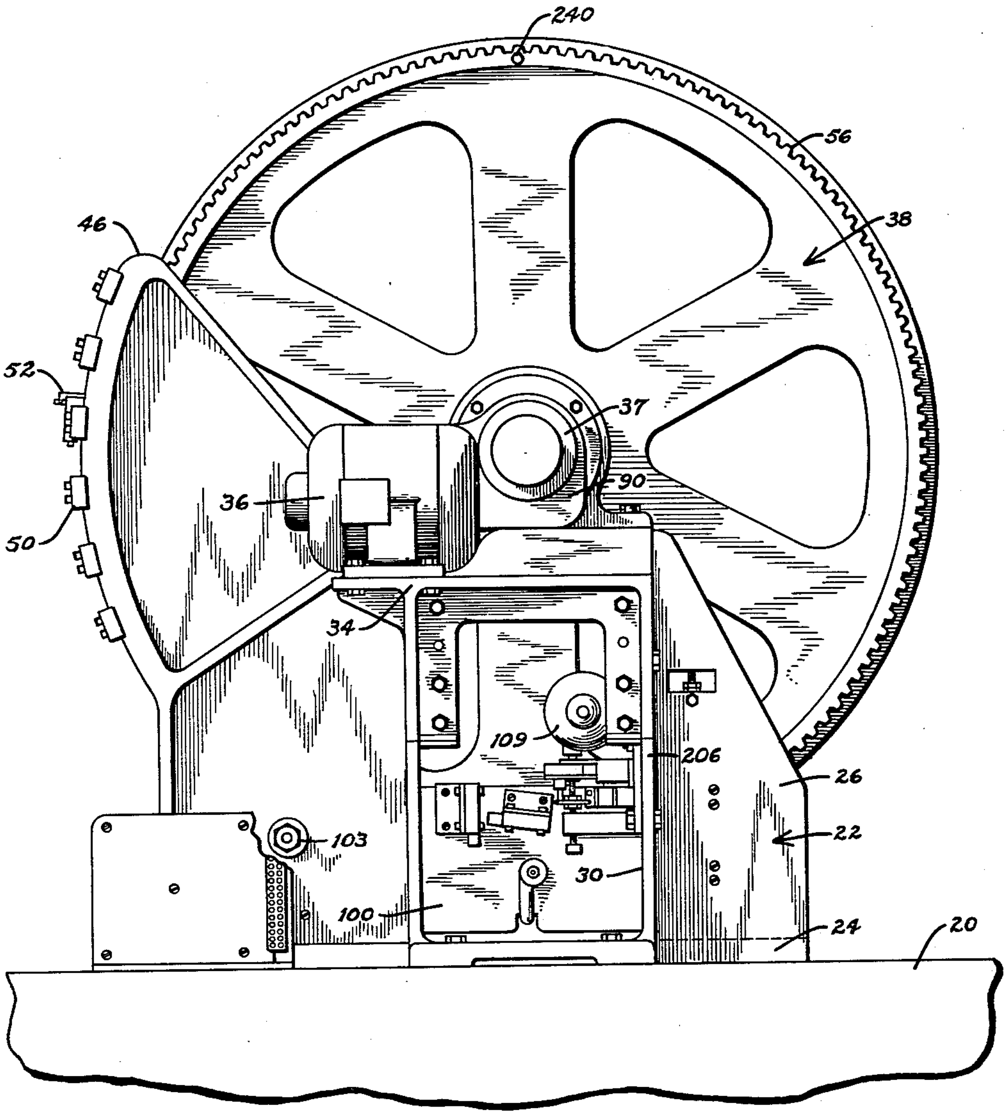
Figure 3:
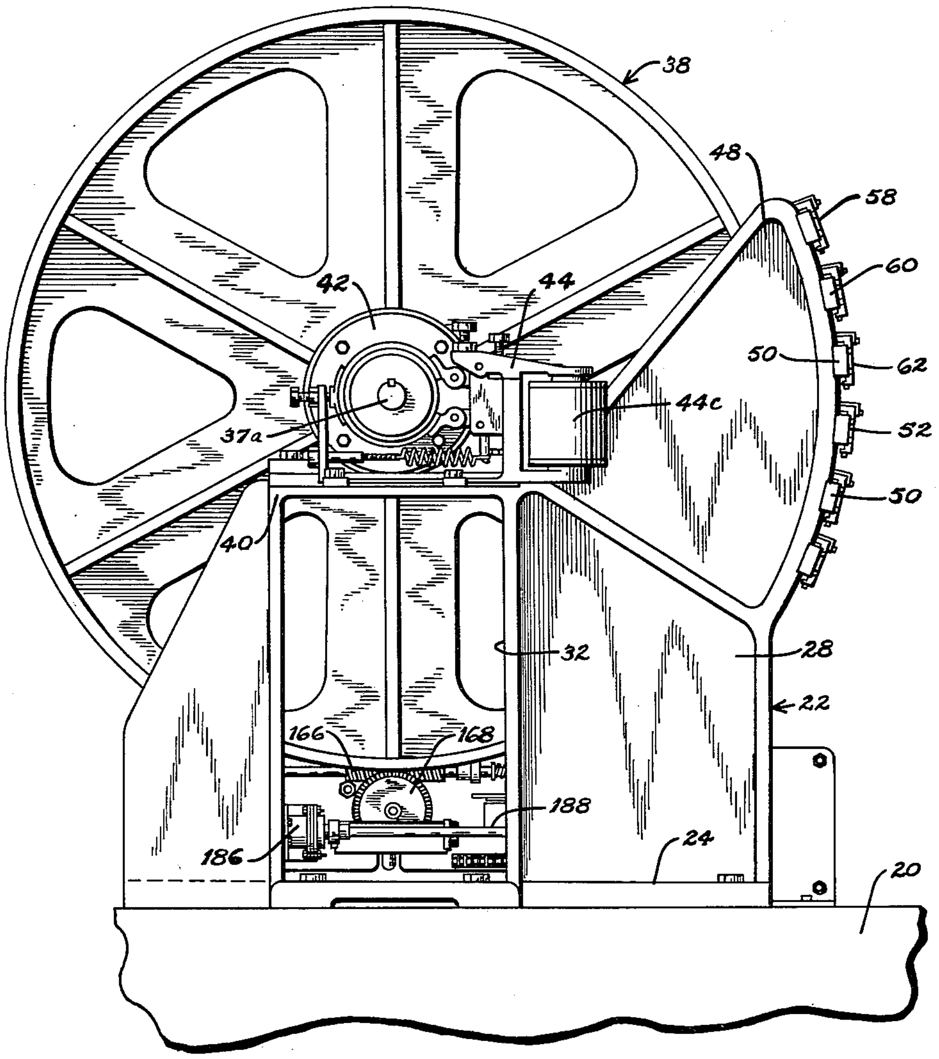
FIGURE 3 is a rear view of the apparatus.

Referring to FIGURE 1, the numeral 20 designates a platform, table or the bottom wall of a cabinet or other support upon which the apparatus would be positioned. The numeral 22 generally designates the stationary frame of the apparatus. Frame 22 includes a lower horizontally extending plate 24 preferably directly secured to the support 20 and also includes front and rear vertically extending frame walls 26 and 28. As is best indicated in FIGURES 1 and 3, the respective front and rear frame walls 26 and 28 may be provided with openings 30 and 32 intermediate their ends. The opening 30 at the top of the front frame wall 26 is bridged by a forwardly extending supporting platform 34 for a motor 36, as well as by a support for the front journal 37 for the shaft *37a* of data storage drum 38. Similarly, as is shown in FIGURE 3, the opening 32 in the rear frame wall 28 is bridged by a plate 40 which supports the rear journal 42 for the drum shaft *37a*, as well as a brake 44 hereinafter described. As is best shown in FIGURES 1 and 3, the frame walls 26 and 28 project upwardly at one end thereof as indicated at 46 and 48, respectively. These upwardly projecting portions carry cross bars 50 arranged concentrically with the periphery of drum 38. As is hereinafter described, the cross bars 50 support magnets generally designated 52.

As is described in said Cohen et al. and Coombs et al. applications, the drum may have an outside diameter of thirty-four inches and a width of approximately ten and one-half inches. The drum is formed of aluminum or other non-magnetizable material and will have its periphery covered with magnetic tape 54. By the present invention, the forward edge of the drum 38 is provided with a circumferentially extending worm wheel 56 which comprises an element of one drive arrangement for the drum.

By the system illustrated in the drawings, each track upon the drum 38, other than the timing and control tracks, will have a group of three magnets 52 associated therewith, the three magnets being respectively mounted on vertically adjacent cross bars 50 so that they will be spaced circumferentially of the path of the drum. The uppermost magnet, designated 58, of each group, will be a re-writing or altering magnet, the next lower magnet designated 60 may be used for erasing, as well as for original or fresh recording or writing, while the lowermost magnet 62 of the series is a reading magnet. As is indicated in FIGURE 2, because the magnets must usually be of a greater width than the drum tracks with which they are associated, the three upper cross bars 50 carry the magnets for alternate tracks of the drum and the magnets for the intervening tracks are supported upon the three lower cross bars 50.

Figure 2:
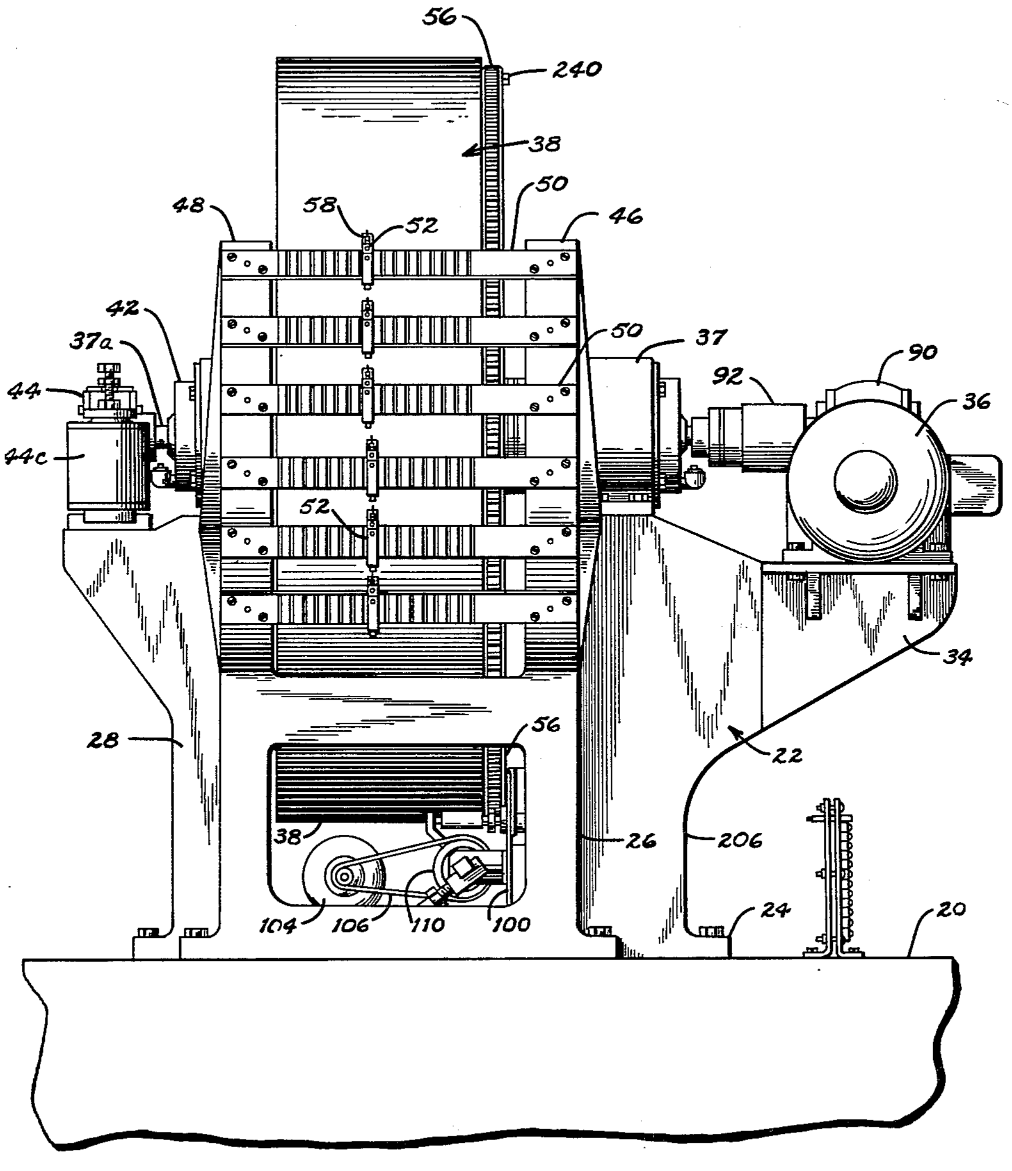
FIGURE 2 is a side view looking toward FIGURE 1 from the left of the latter figure.

Motor 36 illustrated in FIGURES 1 and 2 is used to drive the drum 38 continuously at high speed and with continuous and uniform movement. The motor performs its driving function through a reduction gearing enclosed in casing 90 and an overrunning clutch enclosed at 92. The motor will usually drive the drum at a speed of the order of 220 r.p.m. The brake 44 shown in FIGURE 2 is electrically operated to stop rotation of the drum in a reasonably short time after power to motor 36 has been cut off. It will be perceived that motor 36 comprises a means to drive the drum continuously at high speed. Drive of the drum by motor 36 will be used during erasing and reading of data, as well as during altering or re-recording of data.

Figure 4:
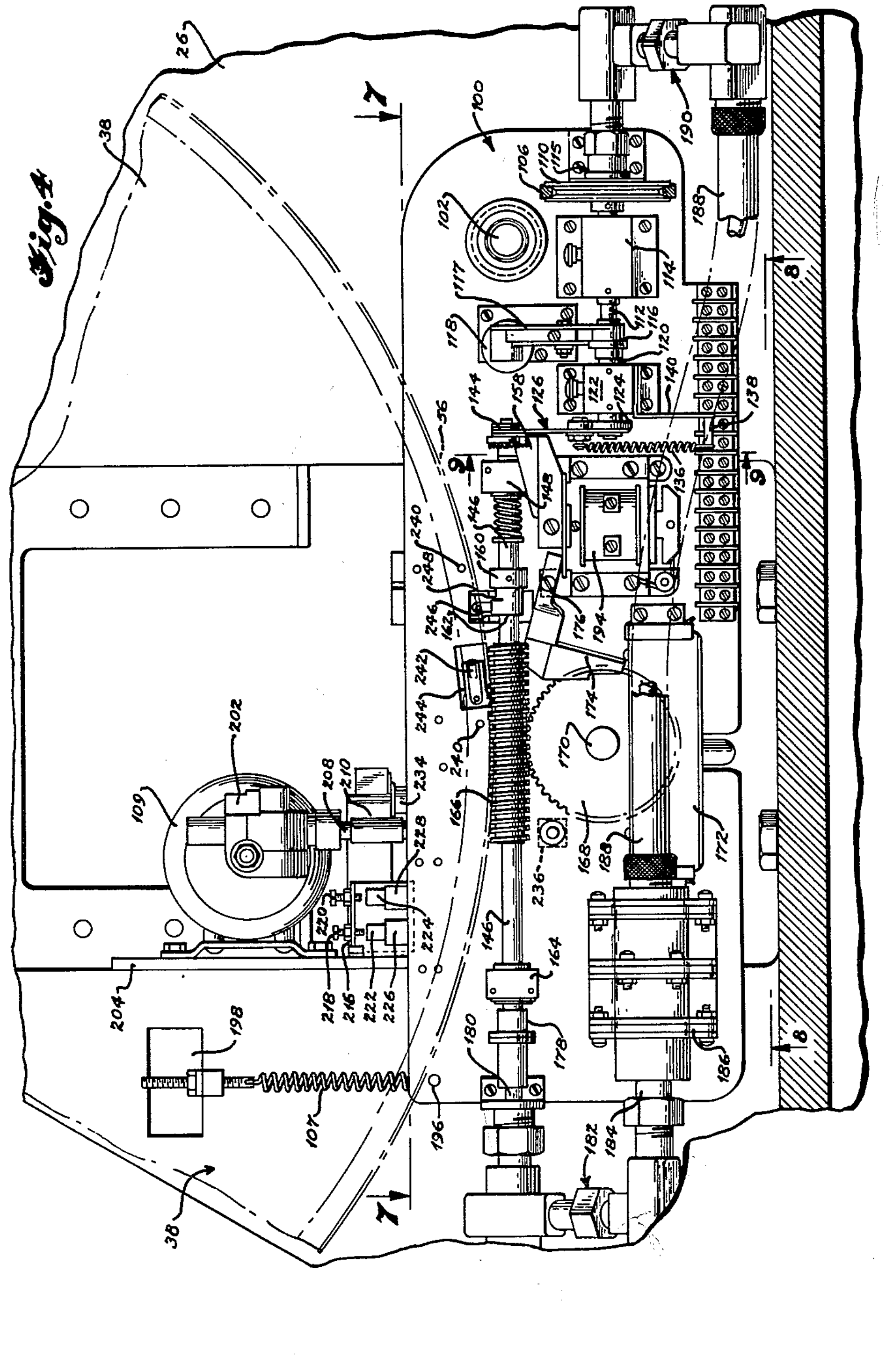
FIGURE 4 is an elevation of one of the drive mechanisms, the view looking toward the apparatus from the rear and showing, on an enlarged scale, structure partially illustrated at the lower portion of FIGURE 3.

As is best shown in FIGURES 4 to 8, and particularly in FIGURE 4, within the supporting frame 22 and beneath drum 38 a carrier plate generally designated 100 is pivoted to the front frame wall 26. The pivot for carrier plate 100 is a stud 102 extending horizontally and rearwardly from the frame wall 26 so that the carrier plate 100 may have a swinging movement in a vertical plane lying parallel to the radial faces of the drum. Stud 102 extends through the frame wall 26 and is secured in position by a nut 103 bearing against the opposite side of the frame wall. It will be observed that carrier plate 100, being pivoted upon the forward frame plate 26, will be positioned substantially beneath the worm wheel 56 of drum 38. This relationship of the carrier plate 100 to the worm wheel 56 as well as the remainder of the apparatus can best be ascertained from FIGURE 2 which shows the plate 100 as viewed from the right of FIGURE 4.

Carrier plate 100 supports various driving connections to rotate drum 38 step by step during recording and alteration of data upon the drum. In addition, carrier plate 100 supports driving connections to "home" the drum, viz., bring a predetermined point on the drum to a recording or writing starting position with respect to the magnets. This homing drive includes connections to first move the drum by continuous movement until it is adjacent starting or "home" position and then move the drum step by step through a further brief rotation until the actual home position is reached. These driving connections are discussed in the immediately following section, while the controls therefor are discussed under the section headed "Drive Controlling Circuits."

*Drive Elements*

Figures 5, 6:
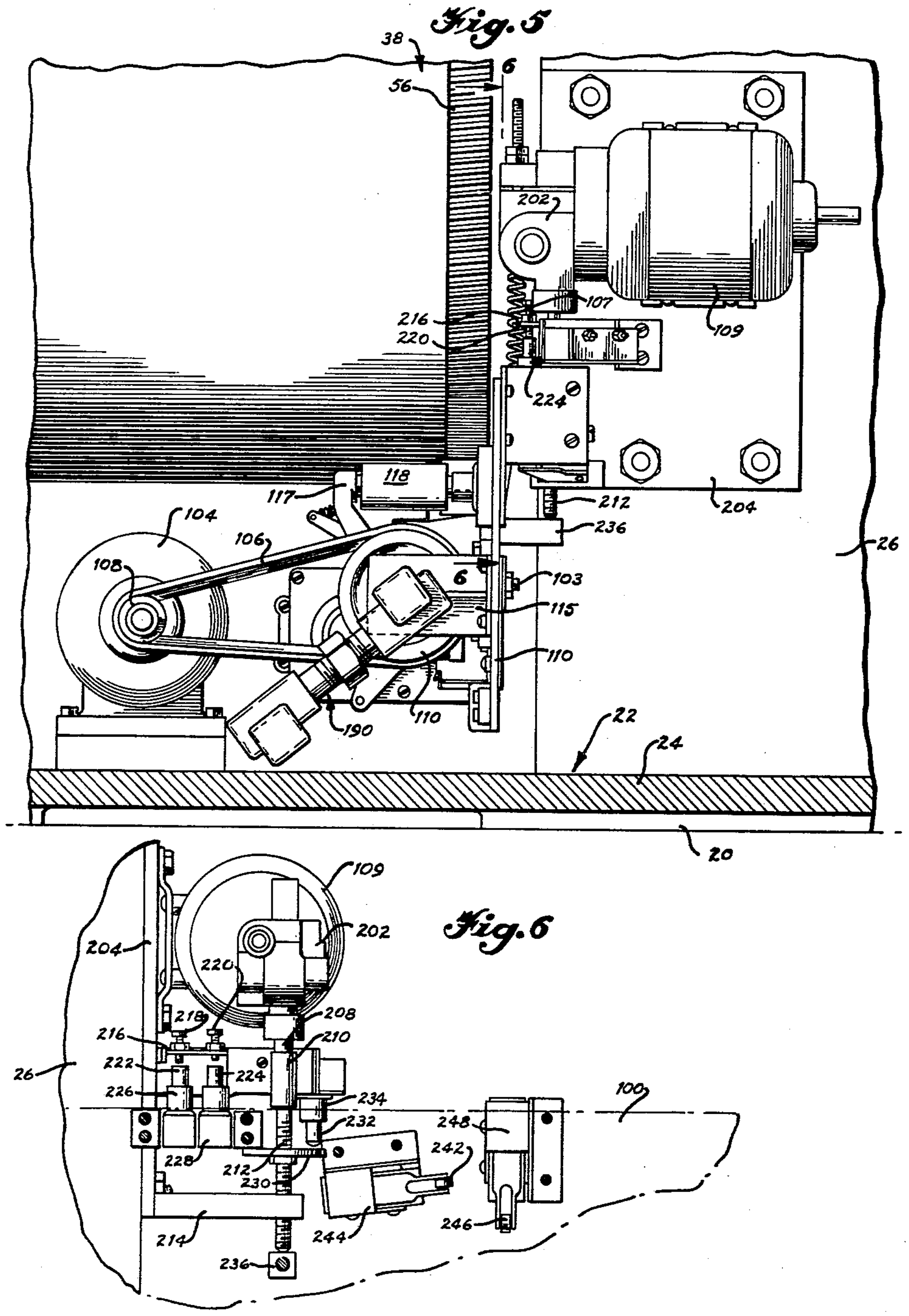
FIGURE 5 is a view of the drive mechanism of FIGURE 4 looking from the right toward the latter figure.
FIGURE 6 is a vertical sectional view on the line 6—6 of FIGURE 5.

As is best shown in FIGURE 5, the driving connections or elements on carrier 100 are driven from a motor 104 secured to the base plate 24 of supporting frame 22. It will be noted that a belt 106 moving about a pulley 108 on the drive shaft of motor 104 extends about a pulley 110 fixed to a shaft 112 journalled in brackets 114 and 115 fixed to carrier plate 100. By comparing FIGURES 4 and 5, it will be observed that the axis of the motor pulley 108 is at right angles to the axis of stud 102 about which the carrier plate 100 swings. However, because the swinging movement of carrier 100 is very slight and also because the driven pulley 110 carried by carrier 100 is closely adjacent the axis of swinging movement of the carrier, as well as because belt 106 is flexible, motor 104 will drive pulley 110 in every position carrier 100 can assume.

Carrier 100 is drawn to upward position by spring 107, this movement being controlled by a motor 109. Motor 109 also moves carrier 100 downwardly, all as hereinafter explained in detail.

Figure 7:
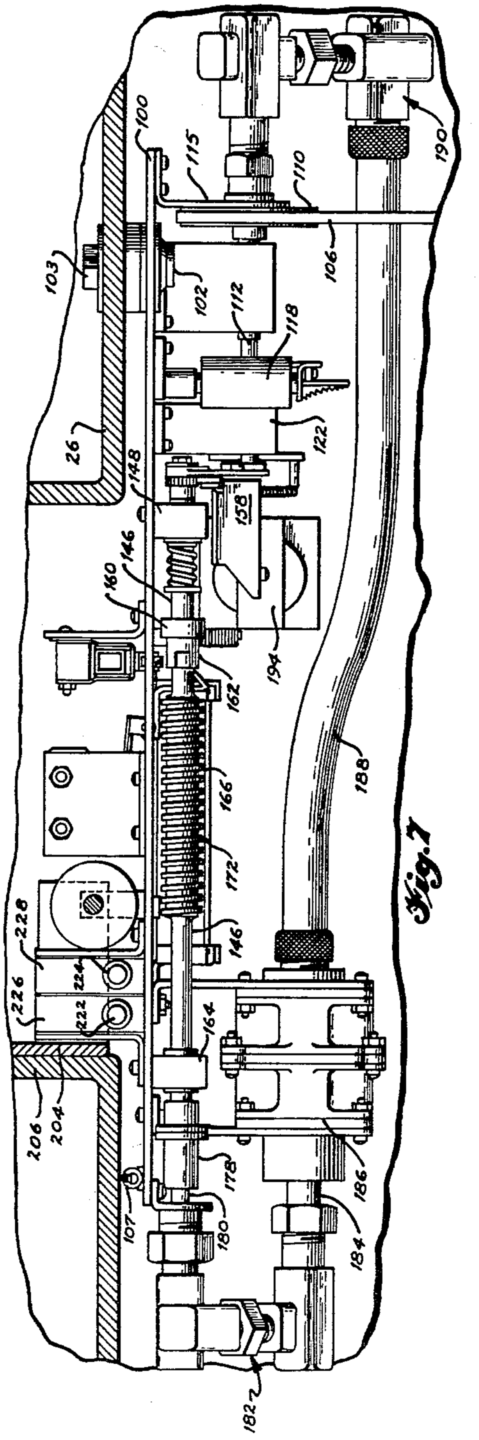
FIGURE 7 is a view of the driving mechanism taken on the line 7—7 of FIGURE 4.
Figure 8:
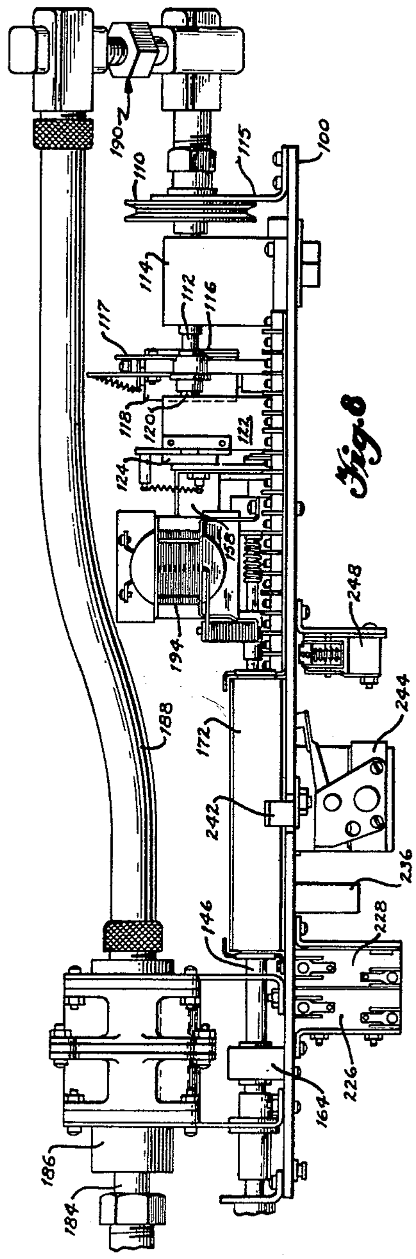
FIGURE 8 is a view on the line 8—8 of FIGURE 4, viz., a bottom view of the drive mechanism of FIGURE 4.

As is indicated in FIGURES 4, 7 and 8, the shaft 112 to which pulley 110 is fixed extends into a one-revolution clutch, indicated at 116, and actuated by a mechanism 117 controlled by an electromagnet 118. By this arrangement, when shaft 112 rotates with continuous movement, the driven shaft 120 connected to the one-way clutch 116 will only be rotated when the magnet 118 controlling mechanism 117 has been energized, and, when magnet 118 is energized, shaft 120 will only be rotated for a single revolution, and will then stop. It will be observed that clutch 116 thus comprises a periodic engagement clutch.

Figure 9:
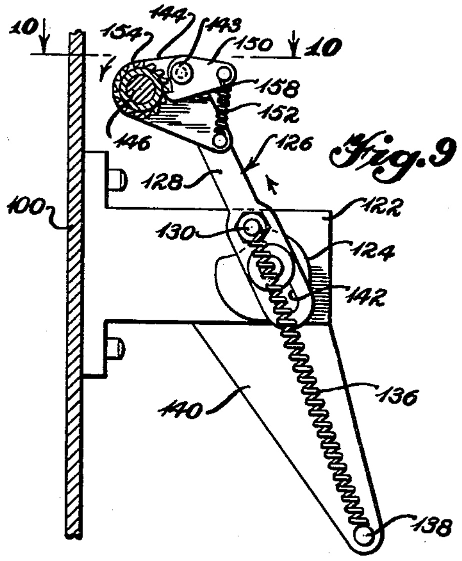
FIGURE 9 is a detail vertical and transverse section on the line 9—9 of FIGURE 4.
Figure 10:
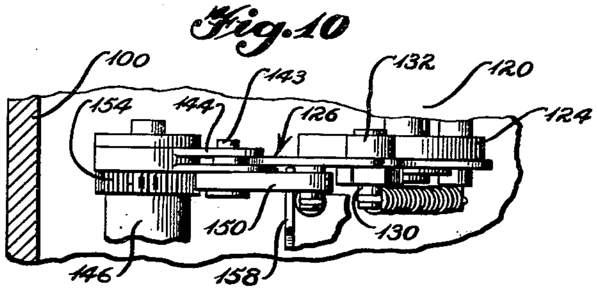
FIGURE 10 is a detail section on the line 10—10 of FIGURE 9.

Shaft 120 is journalled in a bracket 122 fixed to carrier plate 100 and the opposite end of the shaft (the left-hand end in FIGURES 4, 7 and 8) has a cam 124 fixed thereto. As is best shown in FIGURES 9 and 10, a cam follower or pawl actuator generally designated 126 is associated with the cam 124, the cam follower including an arm 128 having a pin 130 secured at one end thereof and which pin has a roller 132 mounted thereon. A spring 134 extending between the pin 130 and a pin 138 fixed to an arm 140 fixed to journal bracket 122 holds the roller 132 in engagement with cam 124. The movement of the arm 128 with respect to the cam is guided by the provision of a slot 142 in arm 128 and which slot rides on shaft 120 adjacent cam 124. The opposite end of cam follower arm 128 is pivotally connected at 143 to an arm 144 pivotally mounted upon the end of a shaft 146 journalled in a bracket 148 also fixed to carrier 100. As is shown in FIGURES 10 and 4, shaft 146 is parallel to but offset from the driven shaft 120 which carries cam 124.

A pawl 150 is also pivoted on pin 143. Pawl 150 is normally urged in a clockwise direction as viewed in FIGURE 9 and about its pivot 143 by the action of a coil spring 152 which extends from the outer end of the pawl to the arm 144. Pawl 150 is adapted to engage a ratchet wheel 154 fixed to the shaft 146.

It will be observed that by the arrangement disclosed in FIGURES 9 and 10 and described above, each complete rotation of cam 124 resulting from the operation of the one-revolution clutch 116 will cause cam follower arm 128 to be moved upwardly, thereby swinging the pawl-carrying arm 144 in a clockwise direction with respect to FIGURE 9 so that pawl 150, being in engagement with ratchet wheel 154, will rotate shaft 146 a slight distance. The spring 152 will be of sufficient strength to hold the pawl 150 in driving engagement with the ratchet wheel 154 during this upward and driving movement of the pawl. During return movement of cam follower or pawl actuating arm 128, spring 152 will permit the pawl 150 to ride back over the teeth of the ratchet wheel. The stroke of the cam follower 128 is only sufficient to advance shaft 146 by the length of one tooth of ratchet wheel 154. Ratchet wheel 154 preferably will be provided with about ten teeth so that its extent of rotation on each driving movement of the pawl will be relatively slight and of the order of 36°.

As is hereinafter explained, the pawl 150 can be moved out of engagement with the ratchet wheel 154 by the action of a pawl throw-out or release member 158 in lifting the pawl, viz., rotating it in a counterclockwise direction on its pivot 143 and against the action of a spring 152. When the pawl is thus lifted it will be disconnected from the ratchet wheel 154 and cannot impart any drive to shaft 146.

As is best shown in FIGURES 4, 7 and 8, shaft 146 extends through a second journal bracket 160 and, immediately beyond that bracket, has a cam 162 fixed thereto, the cam including a peripheral tooth or rise 163. The purpose of cam 162 is hereinafter described. Adjacent its opposite end, shaft 146 is journalled in a bracket 164. Between the journal 164 and cam 162, shaft 146 has a worm gear 166 fixed thereto. Worm gear 166 is adapted to mesh with the worm wheel 56 fixed to drum 38 when the carrier plate 100 is swung upwardly on its pivot 102 to a position such as shown in FIGURE 4. A spring 147 surrounding shaft 146 between journal 148 and a collar 147a mounted on the shaft acts as a thrust bearing.

It will be observed from FIGURE 4 that a second worm wheel 168 meshes with worm gear 166 and that worm wheel 168 is rotatable about an axis 170 positioned below worm shaft 166. Worm wheel 168 is an idler and rotates in a trough 172 of lubricant to thereby convey lubricant to worm gear 166 and thence to worm wheel 58. A wiper strip 174 pivoted at 176 on carrier plate 100 includes teeth which mesh with the teeth at one end of worm gear 166 to wipe excess lubricant from the latter and return it to the trough 172.

If desired, a felt wiper supplied with lubricant can be used to lubricate the worm gearing, instead of the trough 172 and wiper strip 174.

Beyond journal bracket 164 (to the left in FIGURES 4, 7 and 8), the worm carrying shaft 146 extends into an overrunning clutch 178. The other shaft 180 connected with overrunning clutch 178 extends into a drive adaptor comprising an enclosed series of shafts and gears generally designated 182. By means of adaptor 182, shaft 180 is drivingly connected to a parallel shaft 184 which extends into a magnetic clutch 186. It will be perceived that drive adaptor 182 simply comprises means whereby the parallel shafts 180 and 184 are drivingly connected for rotation in the same direction. The housing of magnetic clutch 186 is fixed to carrier plate 100.

As shown in FIGURES 7 and 8, driving connections extend to the right from magnetic clutch 186, these connections comprising an enclosed flexible shaft generally designated by the numeral 188. At its opposite end flexible shaft 188 is connected to a drive adaptor generally designated 190 and having the same function as the drive adaptor 182. Drive adaptor 190 is connected to the shaft 112 to which pulley 110 is fixed.

It may be generally explained at this point that when the magnetic clutch 186 is de-energized or disengaged, rotation of the shafting within the adaptor 190 and the resultant rotation of the flexible shafting 188 will have no effect in driving worm gear 166 because rotation of the just-mentioned enclosed shafts will have no driving effect upon the shaft 184 extending into the opposite end of the magnetic clutch 186. As a result, when the magnetic clutch is de-energized, rotation of pulley 110 and shaft 112 from the motor 104 will simply cause the worm shaft 166 to be rotated step by step. The speed of thiis movement will be of the order of ten steps per second and, on each step, the drum will move forward by the distance between the centers of two adjacent data-receiving cells or areas. Overrunning clutch 178 is of such design that when worm shaft 166 is being rotated step by step by the action of pawl 150, no drive will be transmitted from shaft 146 to shaft 180. This action of overrunning clutch 178 relieves pawl 150 of the load of driving the drive adaptor 182.

In order to disengage the step-by-step drive of worm gear 166, the pawl throw-out electromagnet 194, best shown in the lower central portion of FIGURE 4, is energized so that the trip 158 fixed to its armature will be lifted as viewed in FIGURE 9 to thereby swing pawl 150 counterclockwise against the action of the spring 152. As has hereinbefore been explained, the result of this will be that shaft 146 will not be driven by the pawl despite the fact that pulley 110 may be rotated by motor 108 and regardless of whether the one-revolution clutch 116 may be actuated by its electromagnet 118. With the drive mechanism in this condition, and with the magnetic clutch 186 energized, rotation of pulley 110 and shaft 112 by motor 104 will result in a drive through drive adaptor 190, flexible shaft 188, magnetic clutch 186, drive adaptor 182, as well as through the overrunning clutch 178, to the worm shaft 146 and its worm gear 166. This drive will be by continuous rotation at the speed of the motor 104 and will rotate the drum at a speed of the order of one revolution per minute.

As has been indicated above, the carrier plate 100 is drawn upwardly, viz., swung clockwise about its pivot 102, as viewed in FIGURE 4, by the action of spring 107. One end of spring 107 is connected to a pin 196 fixed to the upper free corner of carrier plate 100 and the opposite end of the spring is adjustably connected to a bracket 198 fixed to the frame wall 34. In order to control upward movement of carrier 100 downwardly to place the worm gear 166 in either loose or tight meshing relation with the worm wheel 56 of drum 38, or to move it downwardly to completely disengage worm gear 166 from worm wheel 56, the mechanism described immediately below is provided.

As is best shown in FIGURES 4, 5 and 6, a motor 109 and speed reducer 202 are fixed to a plate 204 which, in turn is fixed to the vertical wall of a forward extension 206 of the forward frame wall 26. As best shown in FIGURE 6, the driven shaft 208 of the gear reducer 202 extends downwardly. At its lower end shaft 208 has a fitting 210 fixed thereto in which the upper end of a shaft 212 is slidably keyed. In other words, while shaft 212 is free to move upwardly and downwardly with respect to the fitting 210 and shaft 208, shaft 212 must rotate with shaft 208 and fitting 210. The portion of shaft 212 below fitting 210 is threaded and, adjacent its lower end, shaft 212 is threadedly engaged in a bore formed in a block 214 also fixed to the motor supporting plate 204. As a result, rotation of threaded shaft 212 with shaft 208 will cause it to move upwardly or downwardly in block 214 and fitting 210, depending upon its direction of rotation with motor 109, which is reversible.

It will be observed that because motor 109 controls the position of worm 166 with respect to the drum worm wheel 56, motor 109 may be regarded as a worm or drum drive positioning motor.

A horizontal plate 216 fixed to the motor supporting plate 204 carries a pair of adjustably positioned set screws or limit stops 218 and 220 which are respectively adapted to cooperate with switch actuating plungers 222 and 224. The plungers 222 and 224 respectively form the operating elements of microswitches 226 and 228 fixed to the upper edge of carrier plate 100, preferably upon the opposite side or face of the carrier from that on which the above-described worm driving mechanism is mounted. The threaded shaft 212 also has a disc 230 adjustably fixed thereto and which is adapted to cooperate with the actuating plunger 232 of a microswitch 234 fixed to the motor supporting plate 204. The lower end of threaded shaft 212 is adapted to engage a block or lug 236 which extends forwardly from carrier plate 100. As is shown in FIGURES 5 and 8, lug 236 also projects from the face of the carrier plate other than the face which carries the worm driving mechanism hereinbefore described.

When the carrier plate 100 is in the upward position shown in FIGURE 4, switch 226 will be open because its plunger 222 will be in its extreme inward or downward position. Switch 226, which may be termed the full disengagement switch, closes or makes contact when its plunger moves to fully upward position with respect to the casing of plunger 222, and the plunger cannot reach that position until worm 166 is fully disengaged from worm wheel 56.

The action of motor 109 and threaded shaft 212 to swing the carrier plate 100 downwardly is as follows: When it is desired to move the worm gear 166 of worm shaft 146 entirely out of engagement with the worm wheel 56 of drum 38, motor 109 is energized to rotate shaft 208 and fitting 210 in such direction that rotation of threaded shaft 212 will cause the latter, by reason of its threaded engagement with block 214, to move downwardly.

The downward movement of threaded shaft 212 will act upon the lug 236 fixed to carrier plate 100 to swing the plate downwardly or counterclockwise, as viewed in FIGURE 4, about its pivot stud 102. The driving action of motor 109 will continue until the downward swinging movement of carrier plate 100 has proceeded far enough to permit the actuating plunger 222 of switch 226 to move outwardly or upwardly with respect to switch 226 to thereby break the driving circuit of motor 109. Because the worm gear 166 is now entirely free of worm wheel 56 of drum 38, the latter can be rotated at high speed by the action of its driving motor 36.

It is desirable to enable the carrier plate 100 to be swung upwardly to bring worm gear 166 into loose engagement with worm wheel 56 that the drum 38 can be driven at relatively slow speed and by continuous movement or to bring worm 166 into tight engagement with worm wheel 56 so that drum 38 can be driven step by step. Certain controls for automatically effecting such operation, as well as downward movement, are hereinafter described but, in general, the action is as follows: To swing carrier 100 and worm 166 upwardly, the driving circuit for worm positioning motor 109 will be energized to rotate threaded shaft 212 in such direction as to cause it to rotate upwardly through block 214. This upward movement of shaft 212 will permit spring 107 to swing carrier plate 100 upwardly, but this upward swing will, of course, be limited by the engagement of shaft 212 with lug 236 fixed to carrier plate 100. As is hereinafter explained, during upward movement of carrier plate 100 and worm 166 the actuating plunger 224 of microswitch 228 will contact with stop 220, at which time switch 228 will be opened. Switch 228 is closed when its plunger 224 is in its extreme outward or upward position with respect to the plunger casing and is opened when plunger 224 is depressed with respect to the switch. Stop 220 will be adjusted to a position wherein it will open switch 228 when carrier plate 100 swings upwardly sufficiently far to cause worm 166 to be positioned in loose driving engagement relationship with worm wheel 56 of drum 38 and the switch will remain open during further upward movement of the carrier. In the loose driving engagement, the two gears will be out of close or maximum mesh with each other by a distance of the order of several thousandths of an inch, so that they will have such a driving relationship that the drum can be rapidly rotated without undue resistance between gears 166 and 56.

When drum 38 is to be driven step by step, it is desirable that worm gear 166 closely and tightly engage the worm wheel 56 so that any desired cell or area on the drum can be brought into exactly aligned position with an erasing and recording magnet 60 for recording purposes. By this arrangement, there will be no possibility of corresponding magnetized areas being out of a desired alignment of registry. In order to bring worm gear 166 and worm wheel 56 into this tight meshing engagement the circuit to motor 109 is closed to cause it to rotate in such direction as to draw threaded shaft 212 further upwardly through block 214. Such rotation will be continued until carrier plate 100 has swung upwardly under the influence of spring 107 a sufficient distance to permit worm gear 166 to tightly engage worm wheel 56. Rotation of shaft 212 will continue for an instant after this occurred and so that the lower end of the shaft will move entirely out of engagement with the lug 236 of carrier plate 100. Then the disc 230 fixed to the threaded shaft 212 will engage the plunger 232 of the microswitch 234 to move that plunger upwardly or inwardly to thereby break the driving circuit of motor 109. As is indicated in FIGURE 11, the contact 212′ carried by the plunger of switch 234 has two fixed contacts 234A and 234B in its path. Contact 234A will be engaged by the plunger contact 212′ when worm 166 and worm wheel 156 are tightly engaged, while contact 234B will be engaged when the two worm gears are either in loosely engaged position or fully disengaged position, as well as in positions intermediate the two last-mentioned positions.

*Drive Controlling Circuits*

FIGURES 11 and 12 diagrammatically show the control circuits and elements whereby drum 38 will be connected to one of the several sources of power and then driven as best suited for each of the several principal operations of the drum. These several operations are (*a*) high-speed reading or analyzing of data which has been recorded upon the drum, (*b*) high-speed recording, (*c*) high-speed erasing of data from the drum, and (*d*) at low speed, either recording new data upon the drum or altering data which has already been recorded upon the drum.

As is hereinafter explained, the drum will be rotated continuously at a speed of the order of 220 r.p.m. when operations (*a*) to (*c*) are to be performed. In order to connect drum 38 to the high speed driving motor 36 for this type of drive, the control circuits and elements of FIGURES 11 and 12 operated in approximately the same manner. However, when operation (*d*), viz., the step-by-step or slow speed recording or altering of data, is to be performed, the connection of the drum to the step-by-step driving means through worm 166 can be carried out under any one of three conditions. These three conditions are hereinafter termed "Automatic Homing," "Recycle" and "Non-Homing."

Generally speaking, the matter of which of the three conditions will be used to obtain the drive used during operation (*d*) will depend on how drum 38 is connected to the driving means at the moment when it is desired to change over to operation (*d*), or whether the operator wishes to bring the starting or "Homing" point of the drum into alignment with the magnets. However, once the circuits of FIGURES 11 and 12 have been actuated under the selected condition to provide the drive for operation (*d*) the drive of the drum during that operation will always be the same, viz., at the rate of approximately ten stepped movements per second.

FIGURE 13 diagrammaticaly indicates the sequence of the operation of the various elements of the control circuits, including relays R1 to R9 and the switches 226, 228, 234, 244, and 248, during operations (*a*), (*b*), (*c*) and (*d*). However, while FIGURE 13 shows the action of all of the elements in the proper relationship to each other, the time duration of those actions is not accurately proportioned in the figure.

The matter of whether the circuits are to be operated for use of the drum for (*a*) high speed reading, (*b*) high speed erasing, or (*d*) slow speed recording or alteration, is determined by an operation selection switch OS indicated in FIGURE 11 and comprising three blades OS1, OS2, and OS3 which are connected to pivot together but are insulated from each other. In order to select which of the three conditions will be used to bring worm 166 into tight engagement with drum worm wheel 56 for step-by-step drive during operation (*d*), above, there is provided (FIGURE 11) the condition selector switch CS. Switch CS includes three blades CS1, CS2, and CS3 which also pivot together but are insulated from each other.

In connection with FIGURES 11 and 12, it may be stated that the following system is used in designation of the movable contacts of the relays R1 to R9: Each contact blade reference character has the initial letter C, and the first number of the reference character corresponds to the relay number. The second number of each reference character is an even number if the contact is open when the relay is de-energized, and is an odd number if the contact is normally closed when the relay is de-energized.

FIGURES 11 and 12 illustrate operation selector switch OS at "recording," and condition selector switch CS at "automatic homing." However, it assumes that these switches have just been moved to that position and, therefore, shows relays R1 to R9 deenergized, switches 244 and 248 in their normal condition, and switches 226, 228 and 234 in the position they occupy when worm 166 is fully disengaged from drum worm wheel 56. Leads extend between FIGURES 11 and 12, and the lower edge of FIGURE 11 must be aligned with the upper edge of FIGURE 12.

*Drive Controlling Circuits—Reading—Worm Initially in Disengaged Position*

Referring to FIGURE 11, if reading or analyzing of the data upon the drum 38 is to be performed, the operation selector switch OS will be moved to bring its blades OS1, OS2, and OS3 respectively into engagement with the fixed contacts 301, 302, and 303, which are the, "Reading" contacts of that switch. The operator will then momentarily close the starting switch S3. If worm 166 is in fully disengaged position, i.e., entirely out of engagement with the drum worm wheel 56, so that the contact movable with plunger 222 of full disengagement switch 226 shown in the upper left-hand portion of FIGURE 11 is in engagement with fixed contacts 226A and 226A', the following circuit will be closed when starting switch S3 is closed: From one conductor 304 (top of FIGURE 12) of a 60 volt D.C. line, by lead 305 extending (FIGURE 11) to the fixed contact 226A, through the contact blade of switch 226 to fixed contact 226A', and thence by leads 306 and 307 to blade OS1 of switch OS, by contact 301 and lead 308 through normally closed stop switch S4, lead 309 to contact 310 of starting switch S3, through the closed contact of that switch to contact 311, by leads 312 and 313 to the coil of relay R1 and thence by lead 314 to the other conductor 315 of the 60 volt D.C. line.

The energization of relay R1 will cause its normally open contacts C10, C12, C14, and C16 to close. The closing of contact C10 will set up a holding circuit by lead 316, across the now closed contact C10 and by leads 317 and 313, through the coil of relay R1 so that the starting switch may open, and the relay will be held energized until stop switch S4 is opened.

Independently of the closing of starting switch S3 or any operation of switch OS, the fact that worm carrier 100 and worm 166 are completely disengaged from drum worm wheel 56 will cause full disengagement switch 226 to be closed as shown in FIGURE 11. The fact that switch 226 is closed will cause relay R2 to be energized as follows: From conductor 304 of the 60 volt D.C. line, lead 305, switch 226 and lead 306 through the coil of relay R2 (FIGURE 12) and by lead 318 to conductor 315. Because relay R2 is energized, its contact C21 will be open. By being open, contact C21 will hold open a circuit through the worm positioning motor controlling relay R4, and which circuit would be closed if relay R2 were not energized and its contact C21 remained closed. The significance of this action is subsequently explained.

Referring again to the relay R1, when this relay is held energized as explained above, the motor 36 which drives the drum shaft 37*a* and drum 38 by continuous rotation at relatively high speed will be powered by the following circuits through the contacts C12 and C14 of relay R1: From the conductor 320 of a 220 volt A.C. line (center of FIGURE 11) across the closed contact C12, by lead 321 to motor 36, and thence by lead 322 across the closed contact C14 to the other conductor 323 of the 220 volt A.C. line.

Energization of relay R1 also causes the magnetic brake 44 which normally engages drum shaft 37*a* to be released by the following circuit controlled by contact C16 of relay R1: From conductor 326 of 110 volt D.C. line (lower right-hand corner of FIGURE 11) by lead 327, contact C16, leads 328 and 329, through the electromagnetic coil 44*c* to disengage brake 44 and thence by lead 330 to the other conductor 331 of the 110 volt D.C. line.

The above operations initiated by the closing of starting switch S3 are indicated in FIGURE 13 under the heading "Read" appearing in the upper left-hand corner of FIGURE 13 and under the legend "Move Switch OS to Read and Close Start Switch S3." In vertical order under this legend, the energization of the relay R1 is indicated by the rise R1*e* in the horizontal line representing the action of that relay, the energization of the motor 36 is represented by the rise 36*e* in the line representing the action of that motor and the disengagement of the brake 44 is represented by the rise 44*e* in the line indicating the action of the brake. The fact that switch 226 is closed during the foregoing action is indicated by the notation "Closed" in the line indicating the action of that switch, while the energization of relay R2 is designated by the notation "Energized" in the line corresponding to that relay.

As the result of the foregoing actions, drum 38 will now be rotated by continuous movement at a speed of the order of 220 r.p.m. As is hereinafter described under the heading "Magnet Controlling Circuits—Reading and Re-recording," by use of controls associated with the reading magnets 62 the data on the drum can be read. Alternatively, through erasing circuits associated with the erasing and recording magnets 60, data can be erased from durm 38. The movement of the drum can be stopped whenever desired by operating the stop switch S4 of FIGURE 11, thereby breaking the holding circuit through relay R1 so that all of its four contacts will drop to open the circuits therethrough. As a result, motor 36 will be de-energized and brake 44 will be applied. The same effect viz., the stopping of motor 36 and application of brake 44, will be obtained if switch OS is moved from the reading contacts 301, 302, and 303 to the "Erase" contacts 341, 342, and 343 or to the "Recording" contacts. This action is indicated in FIGURE 13 under "Read" and the legend "move switch OS from reading to erase." Reading vertically downwardly under that legend in FIGURE 13, the drops R1*d*, 36*d* and 44*d* associated with the lines respectively corresponding to the relay R1, motor 36 and brake 44 indicate this action as well as the action which would result if the closed stop switch S4 were opened.

*Drive Controlling Circuits—Reading—Worm Initially in Engaged Position*

All of the operations discussed under the preceding heading as occurring when switch OS is moved to "Reading" and starting switch S3 is closed assume that worm 166 is fully disengaged from worm wheel 56 of drum 38 and switch 226 is therefore closed when starting switch S3 is closed. However, if worm 166 is not fully disengaged from worm wheel 56, full disengagement switch 226 will not be closed. Therefore, when switch OS is moved to reading position, its blade OS1 will not be connected to conductor 304 through switch 226. In addition, starting switch S3 will not be connected to conductor 304 through switch 226. Hence, relay R1 cannot be energized to close the power circuit to motor 36 and disengage brake 44. Furthermore, the coil of relay R2 will not be connected to conductor 304 by switch 226. Therefore, when switch OS is moved to "Reading," the following circuit will be closed: From conductor 304 of the 60 volt D.C. line by leads 305 and 345 through the blade OS2 of switch OS, contact 302, leads 346 and 347 (continued on FIGURE 12), by lead 348 and the closed contact C21 of non-energized relay R2, lead 349, the closed contact C71 of non-energized relay R7, lead 350 to the coil of relay R4 and thence by lead 351 to the other conductor 315 of the 60 volt D.C. line. The energization of relay R4 will cause its normally open contacts C40, C42, C44, C46 and C48 to close, while its normally closed contacts C41 and C43 will open. The closing of contact C40 will close the following holding circuit through the coil of relay R4 so that it will remain energized until switch 226 closes: From the conductor 304 of the 60 volt D.C. line by lead 351*a* across closed contact C40, leads 352 and 348, closed contact C21 of non-energized relay R2, lead 349, the closed contact C71 of non-energized relay R7, lead 350, through the coil of relay R4 to lead 351 and the other conductor 315 of the 60 volt D.C. line.

The closing of the contacts C42 and C44 of relay R4 will close the following circuit through the field coil 109' of the worm positioning motor 109: From conductor 356 of a 110 volt A.C. line (lower right-hand corner of FIGURE 11) by a lead 357 (continued on FIGURE 12) and lead 358 across the closed contact C42, leads 359, 360 (continued on FIGURE 11) through the field coil 109', lead 361 (continued on FIGURE 12), closed contact C44, and thence by lead 362 (continued on FIGURE 11) to the other conductor 363 of the 110 volt A.C. line. The closing of the contact C46 and C48 of relay R4 will close the following circuit through the winding of worm positioning motor 109: From conductor 356 of the 110 volt A.C. line, leads 357 and 366, closed contact C46, leads 367 and 368 (continued on FIGURE 11), the winding of motor 109, lead 369 (continued on FIGURE 12) and 370, the closed contact C48 of relay R4 and then leads 371 and 362 to the other conductor 363 of the 110 volt A.C. line.

Motor 109 being reversible, and with its coil in series with its winding, the result of powering it by the circuit just described above will be to cause it to rotate shaft 208 (FIGURE 6) and the threaded shaft 212 so that the latter will move downwardly through the threaded lug 214 fixed with respect to the base of the machine and thereby exert pressure on the lug 236 fixed to the carrier plate 100. This action will cause the carrier plate 100 and the worm shaft 166 to be moved about the carrier plate pivot 102 and away from the worm wheel 56 carried by drum 38. The rotation of worm positioning motor 109 will continue until the worm shaft 166 and carrier 100 are in fully disengaged position with respect to worm wheel 56. When fully disengaged position is reached, the plunger 222 of full disengagement switch can move outwardly with respect to its casing shown in FIGURE 6 by reason of moving away from stop screw 218. The contact blade of switch 226 will thereby engage the fixed contacts 226A and 226A'.

When the full disengagement switch 226 closes, it will energize relay R2 by the circuit explained above in the third paragraph below the heading "Drive Controlling Circuits—Reading—Worm Initially in Disengaged Position." Such energization of relay R2 will cause its contact C21 to lift, thereby breaking the holding circuit through the coil of relay R4 so that the circuits through the contacts of relay R4 which have been supplying power to the worm positioning motor 109 will be broken, and the movement of the worm 166 away from the worm wheel 56 will stop.

If the operator has kept the starting switch S3 closed during the time that the worm 166 has been moving to full disengagement position, or if the operator now closes starting switch S3, relay R1 will be energized to close the same circuits to motor 36 and brake 44 as have been described above under the heading "Drive Controlling Circuits—Reading—Worm Initially in Disengaged Position." Therefore, the drum 38 will be continuously rotated at relatively high speed by motor 36.

It will be observed that once the operator moves operation selector switch OS to "Reading," the fact that a holding circuit is then established through the coil of relay R4 insures that the movement of worm 166 from worm wheel 56 will continue until the worm is fully disengaged and switch 226 closed to energize relay R2.

The action of relay R4 described above is not indicated on FIGURE 13.

*Drive Controlling Circuits—Erase*

If data upon any track or tape of the drum is to be erased, the operation selector switch OS will be moved to bring its blades OS1, OS2 and OS3 respectively into engagement with the fixed "erase" contacts 341, 342, and 343. Because the erase contact 341 associated with blade OS1 is directly connected to "reading" contact 302, the same action of the drive controlling circuits will occur when switch OS is moved to "erase" position and start switch S3 is closed as occurs when switch OS is moved to "reading" position. These actions have been discussed above under the immediately preceding headings "Drive Controlling Circuits—Reading—Worm Initially in Disengaged Position" and "Drive Controlling Circuits—Reading—Worm Initially in Engaged Position."

As the result of the foregoing, drum 38 will now be rotated by continuous movement at a speed of the order of 220 r.p.m.

*Drive Controlling Circuits—Recording*

As has been mentioned above, when the drum 38 is to be moved step-by-step for recording thereon, the circuits illustrated in FIGURES 11 and 12 may be operated in any one of several ways or conditions to obtain the desired driving connection of the drum driving worm 166 to the drum worm wheel 56. These three conditions of operation are hereinafter respectively termed "Automatic Homing," "Recycle," and "Non-Homing." The operation of the circuits of FIGURES 11 and 12 under each of the three conditions is hereinafter separately discussed under headings respectively including the above terms.

*Drive Controlling Circuits—Recording Automatic Homing*

The operation of the circuits of FIGURES 11 and 12 under automatic homing condition may be generally described as involving the inward swinging movement of worm carrier 100 and worm 166 from fully disengaged position with worm wheel 56 to loose engagement with the worm wheel. This inward movement is occasioned by spring 107 under the retarding action of worm positioning motor 109. The retarding action is effected by the movement of threaded shaft 212 (FIGURE 6) away from lug 236 of carrier plate 100. Worm 166 is continuously rotated by motor 104 during this swinging movement. When the loose engagement of the worm and worm wheel occurs, worm 166 will rotate drum 36 by relatively slow continuous rotation of the order of 1 r.p.m. until coarse homing of the drum is obtained; that is, the point on drum 38 at which all data starts, or which is used as a starting location for all data, comes closely adjacent starting alignment with the recording and erasing magnets 60. When coarse homing position is reached, then worm positioning motor 109 is again operated so that spring 107 can move worm 166 into tight engagement with worm wheel 56, and then worm positioning motor 109 is stopped. At the same time, the continuous rotation of the worm 166 stops and its step-by-step rotation begins. This step-by-step rotation of the drum continues until the homing point of the drum comes into alignment with the magnets 60. Then recording can be performed with the homing position used as a reference or starting point.

The following description of the actions occurring during the automatic homing condition is divided into sections, each section bearing a heading wherein the final phase indicates the position worm 166 or drum 38 occupies.

*Drive Controlling Circuits—Recording—Automatic Homing—Full Disengagement*

Referring to FIGURE 11, assume that condition selector switch CS has been moved so that its blades CS1, CS2, and CS3 are respectively in engagement with the contacts designated "Auto Homing," namely, the contacts 381, 382, and 383. If operation selector switch OS is now moved to bring its blades OS1, OS2, and OS3, respectively, into engagement with the "Recording" contacts 391, 392, and 393, the operations described below will occur.

Because worm 166 is fully disengaged from worm wheel 56, full disengagement switch 226 will be closed;

Therefore, relay R2 already will be energized independently of switches OS and CS through the following circuit: From conductor 304 of the 60 volt D.C. line by lead 305, through switch 226, lead 306 (continued on FIGURE 12) through the coil of relay R2 and thence by lead 318 to the other conductor 315 of the 60 volt D.C. line. This energization of relay R2 will cause its contact blade C21 to be open, thereby holding open a circuit through the coil of relay R4 to thereby prevent any possibility of relay R4 being energized. Relay R4, when energized, causes the worm positioning motor 109 to be rotated in a direction to move worm 166 away from worm wheel 56 which, of course, is not desired during the following operations. It will be observed that relay R2 is an overruling relay for the relay R4, the latter being the relay which actuates worm positioning motor 109 to move worm outwardly.

When switches OS and CS are operated as described above, the following circuit will be closed: From the conductor 304 of the 60 volt D.C. line by leads 305 and 345 through the blade OS2 of switch OS to its contact 392, by leads 395 and 396 through the coil of relay R3 and thence by lead 397 (continued on FIGURE 12) to the other conductor 315 of the 60 volt D.C. line. Relay R3 is a delayed closing relay and ordinarily will be set to prevent its contact C30 from closing until a period of approximately twenty seconds has elapsed after the movement of switch OS to recording position.

The reason for having relay R3 of the retarded energization type is as follows: Drum 38 may have been in use for reading or erasing and, therefore, has been rotating at high speed by drive from motor 36. Relay R3 is a master relay with respect to every other relay used during automatic homing condition, viz., the relays R5 to R9. Hence, by retarding energization of relay R3, no element involved in setting up the recording drive under this condition can operate until sufficient time has elapsed for the drum to stop rotation. By this arrangement, neither the worm wheel 56 or worm 166, nor any of the elements associated with the latter, can be damage by reason of too early engagement of the worm and worm wheel. The importance of this will be apparent if it is realized that the movement of worm 166 into loose engagement position with worm wheel 56 requires but a few seconds.

When contact C30 of relay R3 closes, a circuit through the coil of the relay R5 (which controls worm driving motor 104) will be set up.

Referring again to relay R5, energization of that relay will result in closing the following circuit through the motor 104 to drive worm 166: From the conductor 356 of the 110 volt A.C. line, leads 357 (continued on FIGURE 12), lead 406, contact C50, lead 407 (continued on FIGURE 11), motor 104, lead 408 (continued on FIGURE 12), contact C52, and then by leads 409 and 362 to the other conductor 363 of the 110 volt A.C. line.

In FIGURE 13, the above energization of relay R5 is designated by the rise R5*e* in the line indicating the action of that relay. The powering of motor 104 is indicated by the rise 104*e* in the line designating the action of that motor. As is explained immediately below, at the same instant that motor 104 is powered, pawl throw-out magnet 194 will be energized and magnetic clutch 186 will also be energized so that the motor 104 will drive worm 166 by continuous rotation through the magnetic clutch.

Energization of relay R9 will cause its contacts C90 and C92 to close. The closing of contact C90 will complete the following circuit: From conductor 363 of the 110 volt A.C. line by lead 414*a*, across the closed contact C90, lead 415*a* through the electromagnet 194, and by lead 416 to the other conductor 356 of the 110 volt of the A.C. line. Energization of the coil of magnet 194 will cause its armature to move finger 158 upwardly, thereby swinging the pawl 150 in a counterclockwise direction as viewed in FIGURES 9 and 11 so that the pawl will be out of engagement with the ratchet wheel 154 fixed to worm shaft 146. Hence, shaft 146 cannot be driven by pawl 150 from shaft 112.

The closing of the other contact C92 of relay R9 will set up the following circuit: From the conductor 420 of the 24 volt D.C. line (shown in the upper right-hand portion of FIGURE 11), by lead 421 through the magnetic clutch 186, thence by lead 422 through contact C92 and then by lead 423 to the other conductor 424 of the 24 volt D.C. line. The engagement of the clutch 186 will cause motor 104 to drive the worm 166 through the drive arrangement shown in FIGURE 4, namely, by belt 106, the drive adaptor 190, flexible shafting 188, magnetic clutch 186, driven shaft 184 and by drive adaptor 182 to the shaft 146 to which the worm is fixed.

Another result of the closing of contact C30 of master relay R3 is the powering of worm positioning motor 109 to permit spring 107 (FIGURE 5) to move worm 166 inwardly from fully disengaged position with respect to worm wheel 56. This circuit also leads from 60 volt D.C. conductor 304 through contact C30 of delayed closing relay R3, switch blade OS3, leads 402 and 410 through the contact C81 of non-energized relay R8, leads 411 and 425 (continued on FIGURE 11) to the movable contact 224′ of loose engagement switch 228. Because, at this instant, the carrier 100 and worm 166 are in fully disengaged position with respect to the worm wheel 56, plunger 224 will be in fully outward position with respect to its casing shown in FIGURE 6 and, therefore, as shown in FIGURE 11, contact 224′ carried by the plunger will be in engagement with fixed contact 228B of switch 228. The circuit beyond fixed contact 228B is by lead 426 (continued on FIGURE 12) then by closed contact C61 of non-energized relay R6, lead 427 (continued on FIGURE 11) to the movable contact 212′ carried by the plunger 232 of tight engagement switch 234. Because carrier 100 and worm 166 are at this instant in fully disengaged position with respect to worm wheel 56, the plunger 232 of switch 234 will be fully outwardly of its casing 234 and, therefore, the movable contact 212′ carried by plunger 232 will be in engagement with fixed contact 234B as indicated in FIGURE 11. Hence, from contact 234B the circuit will continue by lead 428 (continued on FIGURE 12) through the normally closed contact C43 of non-energized relay R4, lead 429 to the coil of relay R7, and then by lead 430 to the conductor 315 of the 60 volt D.C. line. Energization of relay R7 will thereby occur as indicated in FIGURE 13 by the rise R7*e* in the line indicating the action of relay R7.

Relay R7 closes circuits to cause the worm positioning motor 109 to move threaded shaft 212 away from the lug 236 on carrier plate 100 so that spring 107 can move the carrier plate and worm 166 toward worm wheel 56. It will be observed that R7 can only be energized when relay R4 which controls opposite movement of worm carrier 100 is de-energized. The circuits closed by energization of R7 are as follows: From conductor 356 of the 110 volt A.C. line, leads 357 and 435 across the now closed contact C70, lead 436, lead 361 (continued on FIGURE 11) to the field coil 109′ and thence by leads 360 and 437 across closed contact C72 and by leads 438 and 362 to the other conductor 363 of the 110 volt A.C. power line. The winding of motor 109 will be in the following circuit: From conductor 356 of the 110 volt A.C. line by leads 357 and 439 across contact C74 to leads 440 and 368 (continued on FIGURE 11) to the motor winding and then by leads 369 and 441 across contact C76 and by leads 442 and 362 to the other conductor 363 of the 110 volt A.C. line.

It will be observed that the polarity of field coil 109′ of worm positioning motor 109 is now reversed with respect to that obtained when relay R4 was energized as discussed above under the heading "Drive Controlling Circuits—Worm Initially in Engaged Position."

In FIGURE 13, the start of operation of motor 109 is indicated by the rise 109*e* in the horizontal line indicating the action of that motor. The legend "Engage" associated with the rise 109*e* indicates that the motor is so operating that worm 166 moves toward engagement with worm wheel 56.

As soon as motor 109 has moved carrier 100 and worm 166 inward from fully disengaged position with respect to worm wheel 56, the plunger 22 of full disengaged switch 226 will strike the stop 218 of FIGURES 6 and 12 so that the plunger of the switch will move inwardly with respect to its casing, thereby moving the plunger carried contact out of engagement with the fixed contacts 226A and 226A'. As a result, the circuit described above through the coil of relay R2 will be broken so that the contact C21 of this relay may move to closed position. However, the preceding energization of worm drive motor controlling relay R7 will have opened its normally closed contact C71. No circuit can be closed through the coil of relay R4 unless contact C71 is closed. It will be observed that relay R4 cannot be energized unless relay R7 is deenergized and its contact C43 is thereby closed. In other words, the relays R4 and R7 which respectively control drive of motor 109 in one direction or the other, are interlocked against concurrent energization.

Referring to FIGURE 13, the just-mentioned opening of the full disengagement switch 226 is indicated by the drop 226*d* in the horizontal line indicating the action of that switch. The simultaneous de-energization of relay R2 is indicated by the drop R2*d* in the line indicating the action of the relay. These actions will occur only an instant after automatic homing condition begins.

To summarize with regard to the results of the actions described in the present section of the specification, drum 38 is stationary, the worm drive motor 104 is now rotating worm 166 through magnetic clutch 186, and the worm positioning motor 109 is rotating threaded shaft 212 in such direction that spring 107 can swing carrier plate 100 and worm 166 from fully disengaged position toward loosely engaged position with worm wheel 56 of drum 38. Switch 226 is now open and the switches 228, 234, 244 and 248 are in the position indicated in FIGURE 11. The relays R3, R5, R7 and R9 are energized.

As is indicated in FIGURE 13, by the lowered section 44*n* in the line indicating the position of brake 44, the brake on the drum shaft 37A is now engaged to retard rotation of the drum shaft and drum. The purpose of having the brake thus applied is to prevent the chattering which might occur during the driving of the drum which will occur when worm 166 now comes into lose engagement with worm wheel 56. It will be understood that brake 44 does not exert sufficient pressure upon shaft 37A to prevent its rotation by worm 166.

*Drive Controlling Circuits—Recording—Automatic Homing—Loose Engagement*

This stage of the automatic homing involves the action in the circuits of FIGURES 11 and 12 which occur when the worm 166 reaches loosely engaged position with worm wheel 56. Generally speaking, these actions involve stopping further movement of worm 166 toward the worm wheel 56, leaving the two loosely engaged so that motor 104 can rotate the drum at a speed of the order of one r.p.m. toward homed position.

When the carrier 100 and worm 166 have been moved into loosely engaged position with worm wheel 56, the plunger 224 of loose engagement switch 228 will strike the stop 220 so that the contact 224' carried by plunger 228 will move out of engagement with fixed contact 228B and into engagement with fixed contact 228A. As a result, the circuit described above through the coil of relay R7 will be opened and worm positioning motor 109 will stop operation. Referring to FIGURE 13, this action is indicated beneath the arrow associated with the legend "Loose Engagement Position," the movement of switch 228 with its engagement with contact 228B to its contact 228A being indicated by the rise 228C. The de-energization of relay R7 occurring at the same instant is designated by the drop R7*d* in the line indicating the action of that relay, and the stopping of motor 109 is indicated by the drop 109*d* in the line associated with that motor.

With worm 166 in loose engagement with the worm wheel 56, the intermeshing relationship between the two will be such that worm 166 can drive the drum continuously at a speed which, while relatively slow with respect to the rotation resulting from motor 36, will nevertheless be substantially faster than the step-by-step drive of the drum subsequently described in detail.

With the worm 166 now engaged in loose driving relationship with the worm wheel 56, and the worm rotated by motor 104 through magnetic clutch 186, the drum will rotate by continuous movement in a predetermined direction, for example in the direction of the arrow A associated with the fragment of drum 38 shown in FIGURE 11. Such rotation will continue until the pin 240 projecting from one radial face of drum 38 contacts with the roller 242 carried on the free end of the pivoted arm 243 of coarse homing switch 244 which is mounted upon carrier plate 100. The switch arm 243 is normally in engagement with a fixed stop 244B.

*Drive Controlling Circuits—Recording—Automatic Homing—Tight Engagement Position*

When worm positioning motor 109 rotates threaded shaft 212 slightly beyond the position necessary to enable spring 107 to draw worm 166 into tight engagement with worm wheel 56, the plate 230 fixed to shaft 212 (FIGURE 6) will move into engagement with the plunger 232 of tight engagement switch 234. Hence, plunger 232 will be pushed upwardly in its casing fixed to the stationary base of the apparatus.

This upward movement of the plunger 232 will cause contact 212' fixed to the plunger, to move out of engagement with fixed contact 234B and into engagement with fixed contact 234A. Therefore, the circuit through the coil of relay R7 will be broken, so that the power circuit to worm positioning motor 109 will be broken. Bearing in mind that the movable contact 212' of switch 234 is connected to conductor 304 of the 60 volt D.C. line through closed contact C62 of energized relay R60, closed contact C81 of non-energized relay R8, through switch blade OS3 and the closed contact C30 of relay R3, the engagement of movable contact 212' with fixed contact 234A will complete the following circuit beginning with contact 234A: Lead 465 to the blade of homing completion switch 248, the fixed contact 248B with which the blade is engaged, and then by a lead 466 to a pulsing device 467, then by a lead 468 to the magnet 118 which trips the one revolution clutch 116 and by leads 469 and 415 to the other conductor 315 of the 60 volt D.C. line.

The pulsing device 467 includes a circuit making and breaking device driven from a source 467*a* of synchronized current; for example, a sixty cycle source. The circuit maker and breaker will periodically close the circuit path just described. Each time the clutch trip is actuated, shaft 122 will be rotated for one full rotation and then be disengaged from shaft 112. Each rotation of shaft 122 will correspondingly rotate cam 124 to cause pawl 150 to advance ratchet wheel 154 by a distance corresponding to the distance between adjacent teeth of the ratchet wheel. The ratchet wheel preferably will be provided with about ten teeth so that the resultant rotation of shaft 146 to which worm 166 is fixed will be a correspondingly short rotational movement. This rotational movement will, of course, be transmitted to the worm 56 so that the drum will now be advanced step-by-step by very slight increments toward homed position. Bearing in mind that the data receiving cells on the drum tracks may be spaced on centers one-fiftieth of an inch apart, the worm will rotate drum 38 by that distance on each driving movement of pawl 150.

Referring to FIGURE 13, the movement of switch 234 from engagement with contact of 234B and into engagement with contact 234A is indicated by the rise 234*e* in the line indicating the action of that switch and which rise is beneath the legend "Tight Eng. Position." The simultaneous de-energization of relay R7 is indicated by the drop R7*g* in the line associated with that relay, and the resultant stopping of worm positioning motor 109 is indicated by the drop 109*g* in the line indicating the action of that motor. The resultant transmission of pulses to the trip magnet 118 is illustrated in the line indicating the action of the trip magnet 118 by the rise 118*e*. It will be understood that this line should include a number of rises corresponding to the number of pulses of current which occur before homing is completed.

*Drive Controlling Circuits—Recording—Automatic Homing—Homing Complete*

When the ratchet wheel 154 has been rotated sufficiently far to bring the rise 163 on cam 162 (illustrated in FIGURE 7 and diagrammatically in FIGURE 11) against the homing completion switch 248, the blade 246 of that switch will be momentarily moved from its fixed contact 248B into engagement with its fixed contact 248A. Ratchet wheel 154 has only ten teeth and, therefore, not more than ten pulses will be required from pulsing device 467 to move drum 38 from coarse homed position to homing complete position.

The contact of blade 246 of switch 248 with fixed contact 248A will complete the following circuit extending downwardly in FIGURE 11 from contact 248A: By lead 475 (continued on FIGURE 12), through the coil of relay R8 and then by lead 476 to the other conductor 315 of the 60 volt D.C. line.

The energization of relay R8 will cause the circuit to be closed through its contact C82 to energize the brake magnet 44*c* to thereby cause brake 44 to be disengaged from the drum shaft 37*a*. Because worm 166 is now tightly engaged with worm wheel 56, there is no necessity of having the brake applied to prevent chattering between the worm and the worm wheel.

The energization of relay R8 causes its contact C81 to open, thereby locking out the pulsing circuit which passed through this contact.

The energization of relay R8 sets up a holding circuit through contact C80 of that relay.

It will be noted that when contact C81 of relay R8 is opened, the pulsing device 467 becomes inoperative, and relays R7 and R9 cannot be energized.

When the rise 163 of cam 162 actuates the homing completion switch 248 as described above, the drum 38 is at homed position with respect to the magnets so that any desired data on the drum can now be located. Actuation of switch 248 will break the circuit through pulsing device 467 which has been relied upon to move the drum step-by-step to homed position. However, as is hereinafter described, pulses can be supplied to the trip magnet 118 from a tape reader to advance the drum step-by-step during recording or alteration of data thereon, as well as to locate any desired data on the drum for slow speed reading or alteration.

In other words, by the automatic homing operation, the circuits of FIGURES 11 and 12 have brought drum 38, first by slow continuous movement, and then by a step-by-step movement, to homing or starting position with respect to the magnets 60 used for slow speed recording. Other circuits will now be used to apply data to the drum, or alter such data. These other circuits will also take over the control of the elements of FIGURES 11 and 12 (primarily the one rotation clutch 116 and pawl and ratchet 150—154) which will drive the drum. Because motor 104 is still powered, the shaft 112 which will serve as the driving shaft of one revolution clutch 116 will be rotating to supply drive to pawl 150 when clutch 116 is tripped by the other circuits hereinafter described.

It will be noted that at the end of the automatic homing operation, relay R5 is still energized to power worm drive motor 104, relay R8 is still energized to hold brake 44 off, and relays R3 and R6 are energized to maintain R5 and R8 energized. These four relays will remain energized during operations with regard to the drum data and until either of the switches OS or CS are moved to some other position.

*Drive Controlling Circuits—Recording—Non-Homed—Disengagement*

The purpose of the "Non-Homed" condition is to bring worm 166 into tight engagement with worm wheel 56, but without moving drum 38 to homed position.

Assuming that the blades CS1, CS2 and CS3 of condition selector switch CS are respectively in engagement with the "Non-Homed" contacts 501, 502, and 503 and that operation selector switch is now moved from "Erase" to "Recording" position, the relays R3, R5, R7, and R9 will be energized. As a result, worm drive motor 104 will begin rotation of worm 166 through clutch 186, pawl 150 will be disengaged, and the worm positioning motor 109 will rotate threaded shaft 212 in the direction to enable spring 107 to move worm 166 toward the drum worm wheel 56.

Referring to FIGURE 13 and, more particularly, to the legend "Full Disengagement" associated with the portion of the figure entitled "Non-Homed Condition," it will be observed that the action of the switches, relays and other elements at full disengagement of non-homed condition are indicated by the rises or dwells 226*g*, R2*g*, C30″, R5*f*, R7*k*, R9*g*, 104*f*, 109*m*, 194*g*, and 186*g* in the horizontal lines indicating the action of the various elements.

To summarize, worm 166 is now moving from full disengagement position toward lose engagement position and is being rotated continuously by motor 104. Because worm 166 is not yet in engagement with worm wheel 56, drum 38 is stationary.

*Non-Homed Condition—Loose Engagement*

When worm positioning motor 109 has moved worm 166 into loose engagement with worm wheel 56, the plunger 224 of switch 228 will strike the stop 220 so that the plunger carried contact 224′ will be moved from engagement with fixed contact 228B to engagement with fixed contact 228A. This will break the circuit which has been holding relay R7 energized. However, another circuit is immediately set up through relay R7 when contact 224′ of switch 228 engages fixed contact 228A. Hence, the interruption of the operation of worm positioning motor 109 will be almost imperceptible.

The new circuit through relay R7 will be set up by the energization of relay R6. The circuit energizing relay R6 is from conductor 304 of the 60 volt D.C. line, lead 400, contact C30 of energized relay R3, lead 401, switch blade OS3, contact 393, leads 402 and 410, contact C81 of non-energized relay R8, leads 411 and 425 to movable contact 224′ of switch 228, fixed contact 228A, lead 510 to the fixed contact 502, switch blade CS2, lead 446, contact C83 of non-energized relay R8, leads 447 and 448, contact C41 of non-energized relay R4, lead 449 to the coil of relay R6 and thence by lead 450 to the other conductor 315 of the 60 volt D.C. line. The energization of relay R6 will set up a holding circuit through relay R6.

The energization of relay R6 will close a circuit through relay R7 as follows: From conductor 304 of 60 volt D.C. line by lead 400, contact C30, lead 401, switch blade OS3, contact 393, leads 402 and 410, contact C81 of non-energized relay R8, lead 411 and 425, contact C62 of energized relay R6, leads 451 and 427 to movable contact 212' of switch 234, contact 234B, lead 428, contact C43 of non-energized relay R4, lead 429, coil of relay R7, and lead 430 to conductor 315 from the 60 volt D.C. line.

Referring to FIGURE 13, the actions which occur at lose engagement are indicated under the legend "Loose Eng. Position." The engagement of movable contact 224' of switch 228 with contact 228A is indicated in the line indicating the action of switch 228. The energization of relay R6 is indicated by the rise R6*g*, the momentary de-energization of relay R7 is indicated by the dwell R7*m* and the pause in the rotation of motor 109 by the dwell 109*n*.

Another result of the energization of relay R6 will be the de-energization of relay R9 which occurs by the opening of the contact C63 of relay R6. De-energization of relay R9 will result in magnet 194 being de-energized so that pawl 150 will re-engage the ratchet wheel 154, and clutch 186 will be disengaged. As a result, with the rotation of worm driving motor 104 still continuing as started during "Non-Homing—Full Disengagement" a drive to worm 166 is now possible through pawl 150 and ratchet wheel 154.

Referring to FIGURE 13, the de-energization of relay R9 is indicated by the drop R9*h*, the de-energization of magnet 194 is indicated by the drop 194*h*, and the disengagement of clutch 186 is indicated by the drop 186*h*.

*Non-Homed Condition—Tight Engagement*

With motor 109 still rotating to permit spring 107 to move worm 166 toward the drum from loose engagement position, the worm will now come into tight engagement with worm wheel 56. When tight engagement is reached, the contact 212' carried by plunger 232 will move into engagement with fixed contact 234A. When the contact 212' of tight engagement switch 234 moves from contact 234B as described above, the circuit through the coil of relay R7 which controls the worm positioning motor 109 will be broken so that the circuits through its contacts to the motor 109 will likewise be broken. Hence, worm 166 will stop its inward movement in tight engagement with worm wheel 56. Referring to FIGURE 13, the deenergization of relay R7 is indicated by the drop R7*n* and the stop of motor 109 is indicated by the drop 109*p*.

Also, the following circuit through the pulsing device 467 will be set up: From conductor 304 of the 60 volt D.C. line by lead 400, contact C30, lead 401, blade OS3, contact 393, leads 402 and 410, contact C81, leads 411 and 425, contact C62 of energized relay R6, lead 451, lead 427 to movable contact 212' of switch 234, contact 234A, lead 465, the blade of homing complete switch 248, contact 248B, lead 466, pulsing device 467, lead 468, magnet 118, leads 469 and 415 to the other conductor 315 of the 60 volt D.C. line.

The pulsing device 467 will now periodically provide a current flow through the circuit just described so that magnet 118 will trip the one revolution clutch 116. Shaft 122 and its cam 124 will thereby be rotated, one rotation at a time, to actuate pawl 150 so as to rotate wheel 154 and worm 166 step-by-step to advance drum 38. This action has been discussed above under the sub-heading "Automatic Homing—Coarse Homing Position." Such step-by-step rotation will continue until the rise 163 on cam 162 trips switch 248 to move the blade of the switch from contact 248B, thereby breaking the circuit through the pulsing device 467, and moving the blade into engagement with contact 248A. The circuit now closed will include the coil of relay R8, being the same as described through that coil under the subheading "Automatic Homing—Homing Complete." Hence, the contacts of relay R8 will close a circuit extending through the brake magnet 44*c* so that brake 44 is now released.

Referring to FIGURE 13, under the top legend "Tight Eng. Position," the engagement of the blade of switch 248 with contact 248A is indicated by the rise 248*aa* in the line associated with switch 248. The energization of relay R8 is indicated by the rise R8*g* and the energization of magnet 44*c* to release brake 44 is indicated by the rise 44*k*.

As is clear from FIGURE 13, the actuation of the homing completion switch 248 may occur a short time after rotation of ratchet wheel 154 by pawl 150 starts. However, while the duration of this rotation cannot continue for a longer period of time than it requires ratchet 154 and cam 162 to make a complete rotation, nevertheless, if rise 163 of cam 162 is in a position closely approaching the blade of switch 248 when the pawl driven rotation starts, operation of switch 248 may take place almost simultaneously with the movement of worm 166 into tight engagement position.

It will be observed that the end of the non-homed condition, worm 166 will be in tight engagement with worm wheel 56 and in readiness to transmit step-by-step drive to the drum. However, the starting or homing point of drum 38 will not be in alignment with the magnets 62. This is the principal difference between establishing a step-by-step drive for the drum by the non-homed condition instead of either by the automatic homing condition or the recycle condition.

With non-homed condition completed, the drum can be recorded upon or data thereon may be altered during step-by-step rotation of the drum. Circuits then used in recording upon the drum as well as for other operations with respect to the data upon the drum are discussed immediately below.

The terminology used in the specification is for the purpose of description and not of limitation, the scope of the invention being defined in the claims.

I claim:

1. In combination, a base, a driven member movable with respect to said base, a rotatable driving element mounted on said base, said member and element being respectively provided with intermeshing means, said element being movable so that its intermeshing means and that of said member may be in either fully disengaged, loosely engaged, or tightly engaged positions, a first source of power operatively engaged with said rotatable driving element to move it to said fully disengaged, loosely engaged or tightly engaged positions with respect to said driven member, a second source of power including a rotary shaft, a first clutch interposed between said shaft and said rotatable driving element to directly connect said shaft and driving element for uniform rotation of the latter, a second and periodic engagement clutch interposed between said shaft and driving element, said second clutch including an actuating trip for engaging said second clutch when actuated, means to periodically actuate said trip, a pawl and ratchet driving connection between said second clutch and said driving element, a pawl throw-out device, means operative when said driving element is fully disengaged from said data storage member to energize both of said sources of power and so that said first source of power will move said driving element toward engaged position, move said first clutch into engagement, and operate said pawl throw-out to disengage said pawl and ratchet connection, means operated when said driving element reaches loose engagement with said member to de-energize said first source of power, means operated when said driven member moves to a predetermined position with respect to said base to re-energize said first source of power, and actuate said pawl throw-out to cause said pawl and ratchet connection to engage, and disengage said first clutch, and means operated when said rotatable driving element is in tight engagement with said driven member to again de-energize said first source of power and engage said periodic actuating means with the trip of said second clutch.

2. In combination, a base, a data receiving member movable with respect to said base, a rotatable driving element mounted on said base, said member and element being respectively provided within intermeshing means, said element being movable so that its intermeshing means and that of said member may be in either fully disengaged, loosely engaged, or tightly engaged positions, a first source of power operatively engaged with said rotatable driving element to move it to said fully disengaged, loosely engaged or tightly engaged positions with respect to said data receiving member, a second source of power including a rotary shaft, a first clutch interposed between said shaft and said rotatable driving element to directly connect said shaft and driving element for uniform rotation of the latter, a second and periodic engagement clutch interposed between said shaft and driving element, said second clutch inluding an actuating trip, means to periodically actuate said trip, a pawl and ratchet driving connection between said second clutch and said driving element, a pawl throw-out device, means operative when said driving element is tightly engaged with said data receiving member to energize both of said sources of power and so that said first source of power will move said driving element toward fully disengaged position, move said first clutch into engagement, and operate said pawl throw-out to disengage said pawl and ratchet connection, means operative when said driving element is fully disengaged from said data receiving member to operate said first source of power to move said driving element toward engaged position with said data receiving member.

3. In combination, a base, a cylindrical member journalled on said base and having a gear affixed thereto, a carrier pivoted on said base for movement toward and away from said member, means to move said carrier toward and away from said member, a gear element journalled on said carrier adapted to engage the gear on the cylindrical member when said carrier is moved toward said member, driving means to drive the gear element journalled to said carrier, said driving means including a motor and a clutch connection between said gear element and said motor, an alternatively operable second clutch connected between said gear element and said motor, and means controlled by the relative position of said member with respect to said base to operate one of said clutches.

4. In combination: a base; a driven member rotatably mounted on said base, said driven member having a gear mounted coaxially with the axis of rotation of said driven member; and driving means for said driven member including a device for engaging said gear, positioning means for moving said device into various degrees of engagement with said gear means, motor means, first selectable means adapted to connect said motor means to said device for rotating said device at a first uniform speed, second selectable means adapted to connect said motor to said device for imparting an intermittent rotation to said device, and control means responsive to the degree of engagement of said device with said gear means for selecting said first or second connecting means.

5. Apparatus as in claim 4 and further including a second motor means mounted on said base; clutch means for connecting said motor means in driving relation with said driven member; and means including said control means for energizing said second motor means to drive said driven member at a second uniform speed only when said device is wholly disengaged from said gear.

6. In combination: a base; a driven member mounted on a shaft, said shaft being journalled for rotation on said base; a worm wheel affixed to said shaft; and driving means for said driven member including a worm gear adapted to engage said worm wheel, positioning means mounted on said base and arranged to move said worm gear into various degrees of engagement with said worm wheel, motor means, first means including a selectably operable clutch for connecting said motor means to said worm gear for rotating said device at a first uniform speed, second means including a selectably operable cam operated pawl and ratchet mechanism for connecting said motor means to said worm gear for imparting an intermittent rotation to said worm gear, and means responsive to the position of said worm wheel with respect to said worm gear for operating said clutch when said worm wheel and said worm gear are in relatively loose engagement and for operating said cam operated pawl and ratchet mechanism when said worm wheel and worm gear are in relatively tight engagement.

References Cited in the file of this patent

UNITED STATES PATENTS

| | | |
|---|---|---|
| Re. 21,695 | Spencer | Jan. 14, 1941 |
| 990,999 | McGuire et al. | May 2, 1911 |
| 2,489,725 | Rutmiller | Nov. 29, 1949 |
| 2,507,756 | Boylan | May 16, 1950 |
| 2,552,246 | Wilkens et al. | May 8, 1951 |

OTHER REFERENCES

J. M. Coombs: "Storage of Numbers on Magnetic Tape," pp. 201–209, Proceedings of the National Eelectronics Conference held at Chicago, Illinois, November 3–5, 1947, published March 17, 1948; Rogers Printing Company, Chicago and Dixon, Illinois. (Copy in Division 48.)